United States Patent
Christensen et al.

(10) Patent No.: US 9,688,394 B2
(45) Date of Patent: Jun. 27, 2017

(54) ROLLER-BASED DRIVE SYSTEMS WITH COMPLIANCE FOR ACCOMMODATING NON-CONJUGATE MESHING

(71) Applicant: HONEYWELL INTERNATIONAL INC., Morristown, NJ (US)

(72) Inventors: Donald Jeffrey Christensen, Phoenix, AZ (US); Robert Mitchell, Phoenix, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 7 days.

(21) Appl. No.: 14/801,372

(22) Filed: Jul. 16, 2015

(65) Prior Publication Data
US 2017/0015409 A1   Jan. 19, 2017

(51) Int. Cl.
| | |
|---|---|
| *B64C 25/40* | (2006.01) |
| *F16H 57/00* | (2012.01) |
| *F16F 15/121* | (2006.01) |
| *F16H 1/06* | (2006.01) |
| *F16H 1/24* | (2006.01) |

(52) U.S. Cl.
CPC ........ *B64C 25/405* (2013.01); *F16F 15/1216* (2013.01); *F16H 1/06* (2013.01); *F16H 1/24* (2013.01); *F16H 57/0006* (2013.01)

(58) Field of Classification Search
CPC ... B64C 25/405; F16F 15/121; F16F 15/1216; F16F 2236/08; F16F 2236/085; B60K 7/0007; B60K 17/043; B60K 17/046; B60K 17/14
See application file for complete search history.

(56) References Cited

U.S. PATENT DOCUMENTS

| 1,570,758 | A | * | 1/1926 | Malzahn | B60K 17/043 74/391 |
|---|---|---|---|---|---|
| 2,198,834 | A | * | 4/1940 | Nardone | B64C 25/40 185/41 R |
| 5,182,498 | A | | 1/1993 | Stuhr | |
| 6,935,475 | B2 | | 8/2005 | Weilant | |
| 7,156,217 | B2 | | 1/2007 | Raber | |
| 8,277,269 | B1 | * | 10/2012 | Alby | B63H 23/34 416/2 |
| 8,534,431 | B2 | * | 9/2013 | Feusse | B60K 7/0007 188/170 |

(Continued)

FOREIGN PATENT DOCUMENTS

CA        2879327 A1      2/2014

OTHER PUBLICATIONS

Search Report from EP application No. 16178511.8, dated Jan. 18, 2017.

*Primary Examiner* — Joseph W Sanderson
(74) *Attorney, Agent, or Firm* — Shimokaji IP

(57) ABSTRACT

A gearbox for driving a sprocket includes a gear train and an output shaft assembly positioned between the gear train and a power output end of the gearbox. The output shaft assembly includes, a first shaft segment extending to the power output a second shaft segment coupled to the gear train and a torsion spring interposed between the first shaft segment and the second shaft segment. Upon non-conjugate meshing of the sprocket, the torsion spring expands and contracts so that the angular velocity of the second shaft segment differs from the angular velocity of the first shaft segment.

7 Claims, 9 Drawing Sheets

(56) References Cited

U.S. PATENT DOCUMENTS

| | | | | |
|---|---|---|---|---|
| 8,616,493 B2* | 12/2013 | Gaia | ..................... | B64C 25/405 |
| | | | | 244/103 S |
| 8,951,153 B2* | 2/2015 | Ishida | ..................... | F16D 43/18 |
| | | | | 474/74 |
| 9,068,608 B2* | 6/2015 | Serkh | ..................... | F16D 7/022 |
| 9,221,534 B2* | 12/2015 | Bucheton | .............. | B64C 25/405 |
| 9,291,240 B2* | 3/2016 | Eluard | .................. | B64C 25/405 |
| 2008/0300098 A1 | 12/2008 | Serkh et al. | | |
| 2010/0304907 A1 | 12/2010 | Yuan | | |
| 2011/0065537 A1* | 3/2011 | Serkh | ..................... | F16D 7/022 |
| | | | | 474/94 |
| 2011/0245000 A1* | 10/2011 | Serkh | ................. | F16F 15/1216 |
| | | | | 474/94 |
| 2012/0100945 A1* | 4/2012 | Ishida | .................... | F16D 43/18 |
| | | | | 474/69 |
| 2013/0091969 A1* | 4/2013 | Bucheton | .............. | B64C 25/405 |
| | | | | 74/405 |
| 2013/0167678 A1* | 7/2013 | Eluard | ................. | B64C 25/405 |
| | | | | 74/405 |
| 2015/0027256 A1* | 1/2015 | Rodrigues | ................ | F16H 1/06 |
| | | | | 74/411.5 |
| 2016/0096619 A1* | 4/2016 | Daffos | ................. | B64C 25/405 |
| | | | | 244/103 R |
| 2016/0200426 A1* | 7/2016 | Didey | .................. | B64C 25/405 |
| | | | | 74/406 |
| 2016/0214707 A1* | 7/2016 | Didey | .................. | B64C 25/405 |
| 2016/0215855 A1* | 7/2016 | Christensen | ............ | F16H 55/14 |
| 2016/0221668 A1* | 8/2016 | Didey | .................. | B64C 25/405 |

\* cited by examiner

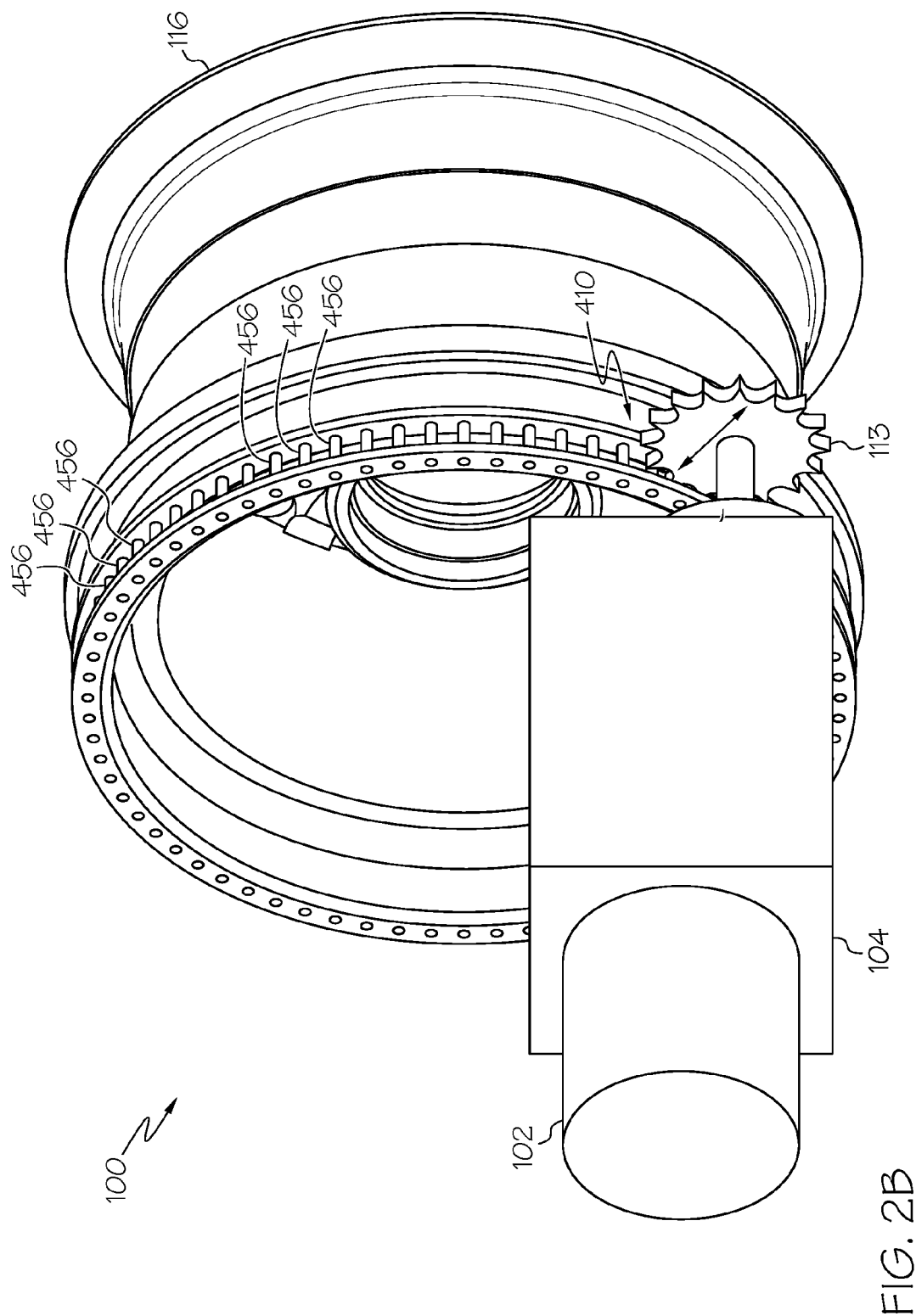

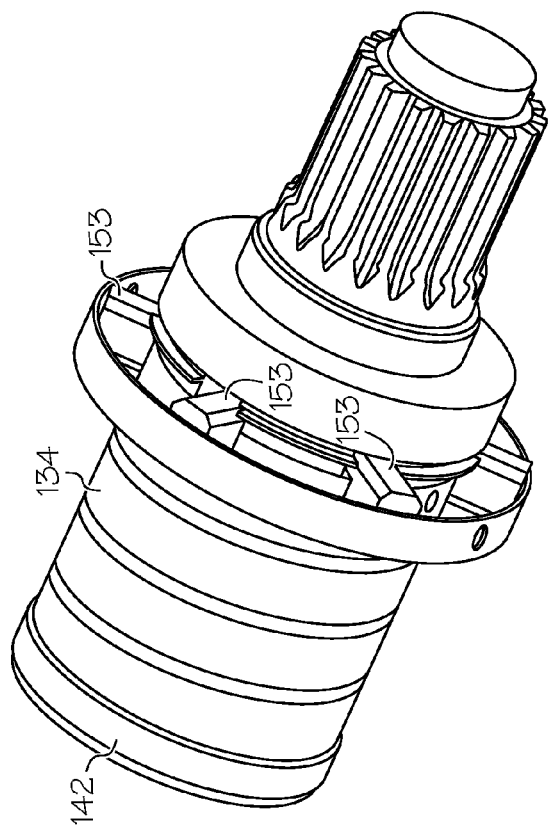
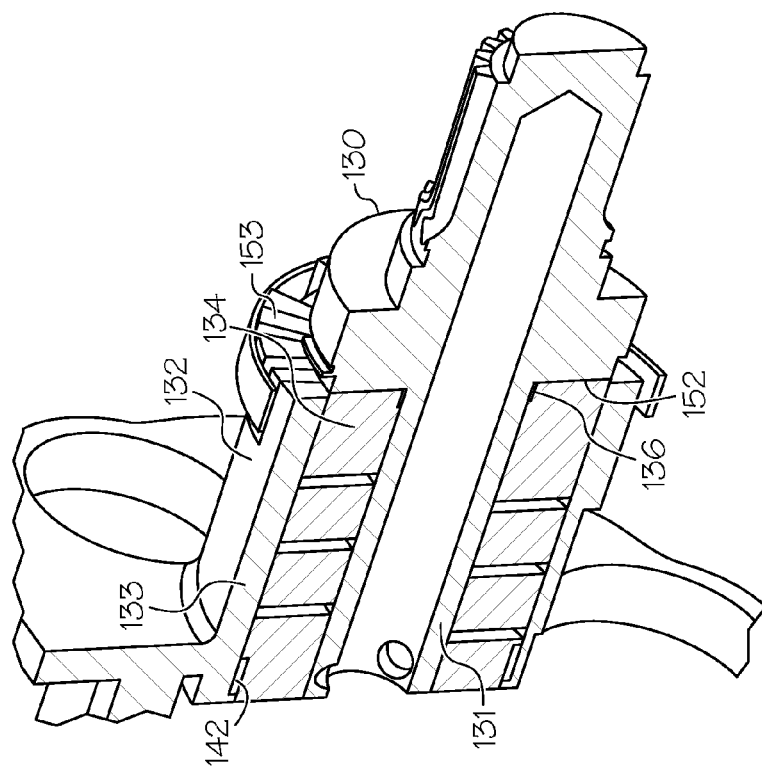

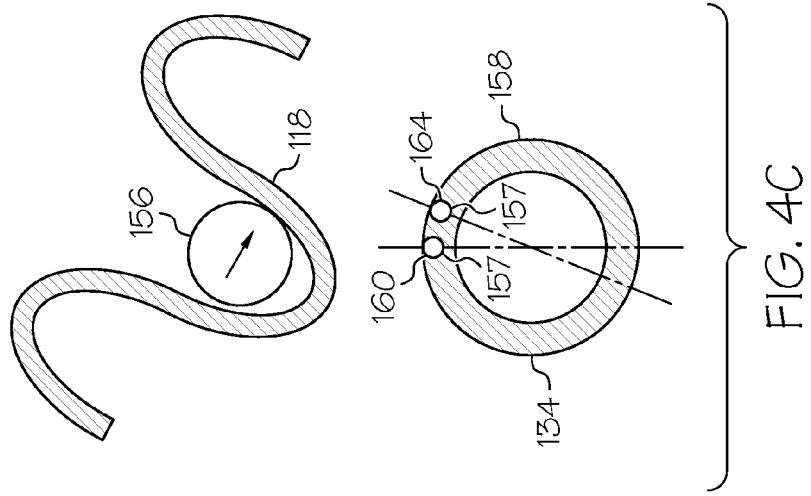
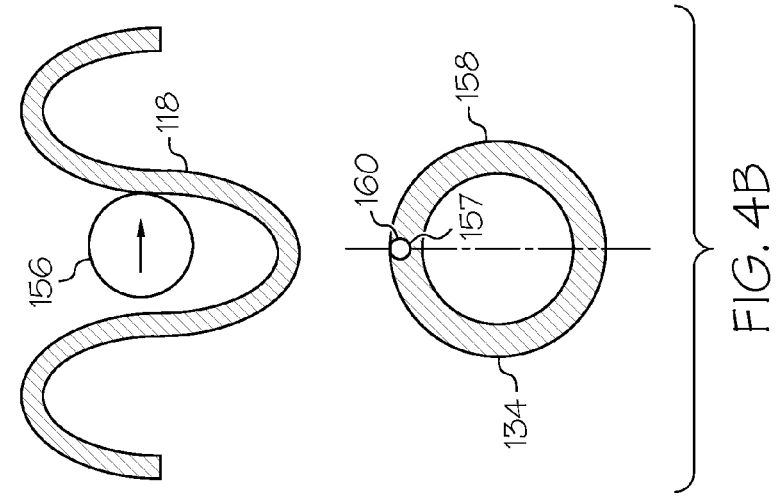
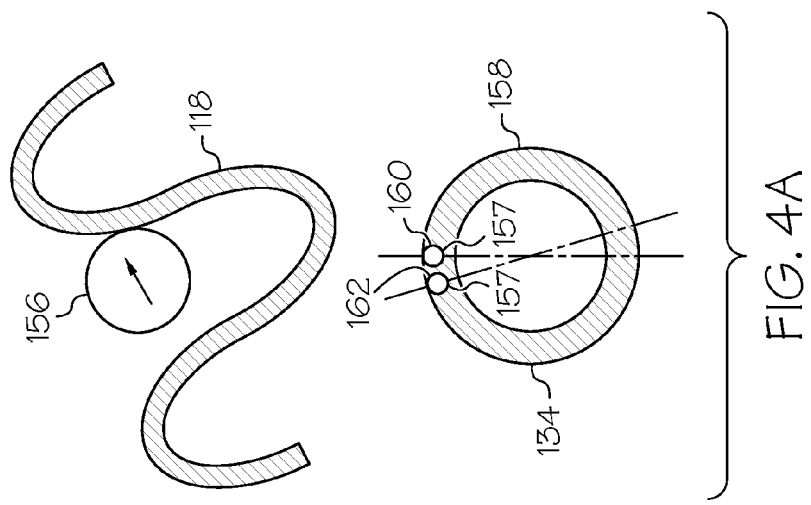

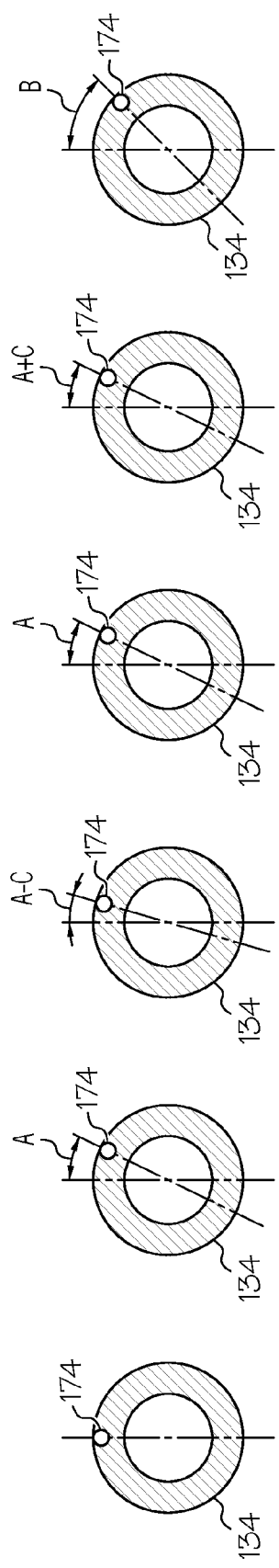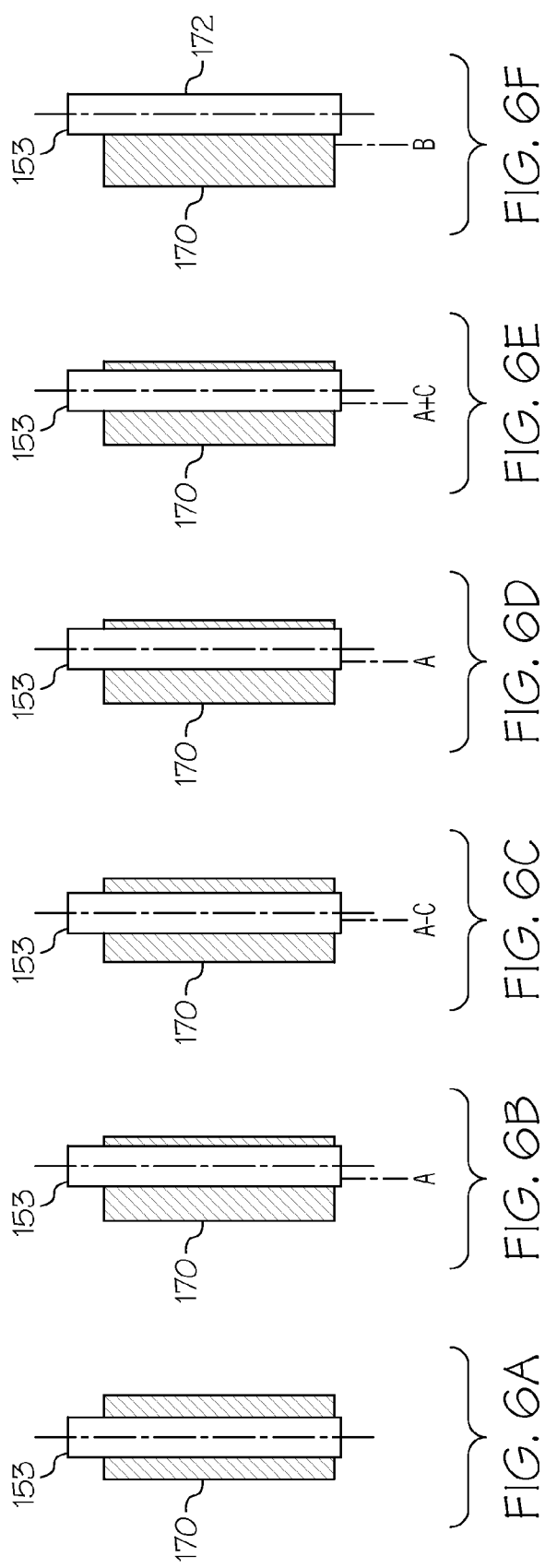

ID: 9,688,394 B2

ROLLER-BASED DRIVE SYSTEMS WITH COMPLIANCE FOR ACCOMMODATING NON-CONJUGATE MESHING

BACKGROUND OF THE INVENTION

The present invention generally relates to drive systems that transmit power through roller and sprockets that may mesh in a non-conjugate manner and, more particularly, to compliance apparatus for such drive systems. Even more particularly, the present invention relates to employment of such drive systems for transmitting torque to wheels of an aircraft.

It is well known that, unlike an involute-gear based drive system, a roller-based drive system may not perform with conjugate action between the driving and driven elements. In other words, a roller and sprocket interaction may result in cyclical variations of angular velocity as each roller progresses through its respective meshing. This non-conjugate meshing may be problematic in certain applications such as motorcycle drive systems, automotive engine-timing drive systems or aircraft electric taxi systems (ETS).

When a conventional gearbox is employed in a drive system that may experience non-conjugate meshing of sprockets and roller, a driven member may experience cyclical acceleration pulses during the meshing of each roller. If the driven member has a large mass, for example an aircraft wheel, these cyclical pulses may not actually materialize as acceleration of the driven member because the inertia of the driven member may be too high. In that case, the cyclical pulses may be fed back into the gearbox in the form of undesirable cyclical shocks.

In an aircraft ETS, for example, it is desirable to construct the ETS with compact and lightweight components which may be retrofitted onto existing aircraft and which may perform reliably even when exposed to varying environmental conditions that may be encountered by the aircraft at various airports. To meet these conditions, some ETS drive systems employ a roller and sprocket arrangement and torque is delivered to the wheel though a driven sprocket.

Some design challenges remain even when such roller and sprocket systems are employed. For example, the wheel rims of many commercial aircraft are designed to allow a limited amount of deflection during taxiing and turning of the aircraft. During taxiing, the load of the aircraft may cause the wheel to ovalize on each revolution. Moreover, the loads exerted on the wheel may cause deflections of the wheel rim with respect to the axle. Weight on an axle during a turn may cause flexure of the wheel rim radially or axially from a driving sprocket.

Under these conditions, a center distance between a sprocket and roller may vary with wheel deflection. Thus, even if a sprocket was uniquely designed to have conjugate action at a particular center distance, the wheel deflection may vary the center distance enough to offset the benefits of the unique sprocket design.

As can be seen, there is a need for a roller-based drive system that will deliver power with non-cyclical angular velocity even when a center distance between a driving element and a driven element may vary. More particularly there is a need for such a system which may be incorporated on an aircraft ETS.

SUMMARY OF THE INVENTION

In one aspect of the present invention, an electric taxi system (ETS) for an aircraft comprises: a roller-based drive system; and a gearbox having an output shaft assembly, the output shaft assembly including; a first shaft segment coupled to a sprocket of the roller-based drive system, a second shaft segment coupled to a gear train of the gearbox, and a torsion spring, wherein the torsion spring interposed between and coupled to the first shaft segment and the second shaft segment, to form a first torque-transmitting path through the output shaft assembly.

In another aspect of the present invention, a drive system comprises; a sprocket having; a plurality of driving elements; and a source of motive power drivably connected to the sprocket with a segmented output shaft assembly; wherein the output shaft assembly includes a first shaft segment rotatably coupled with a second shaft segment through a flexible connecting member; and wherein, during non-conjugate meshing of one of the driving elements, the flexible member accommodates rotational displacement of the first shaft segment rotates relative to the second shaft segment.

In still another aspect of the present invention, a gearbox for driving a driving element of a roller-based drive system comprises: a gear train; and an output shaft assembly positioned between the gear train and a power output end of the gearbox, the output shaft assembly including, a first shaft segment extending to the power output, a second shaft segment coupled to the gear train, a torsion spring interposed between the first shaft segment and the second shaft segment; wherein, upon non-conjugate meshing of the driving element, the torsion spring expands and contracts so that the angular velocity of the second shaft segment differs from the angular velocity of the first shaft segment.

These and other features, aspects and advantages of the present invention will become better understood with reference to the following drawings, description and claims.

BRIEF DESCRIPTION OF THE DRAWINGS

FIG. 2B is a perspective view of an electric taxi system (ETS) in accordance with a fourth exemplary embodiment of the invention;

FIG. 3A is perspective view of a sub-assembly of the gearbox of FIG. 3 in accordance with an exemplary embodiment of the invention;

FIG. 3B is perspective view of a portion of the sub-assembly of FIG. 3A in accordance with an exemplary embodiment of the invention;

FIG. 4A is a schematic diagram showing a first stage of an operational feature of the gearbox of FIG. 3 in accordance with an exemplary embodiment of the invention;

FIG. 4B is a schematic diagram showing a second stage of the operational feature of FIG. 4A in accordance with an exemplary embodiment of the invention;

FIG. 4C is a schematic diagram showing a third stage of the operational feature of FIG. 4A in accordance with an exemplary embodiment of the invention;

FIG. 6A is a schematic diagram showing a first stage of a second operational feature of the gearbox of FIG. 3 in accordance with an exemplary embodiment of the invention;

FIG. 6B is a schematic diagram showing a second stage of the second operational feature of FIG. 6A in accordance with an exemplary embodiment of the invention;

FIG. 6C is a schematic diagram showing a third stage of the second operational feature of FIG. 6A in accordance with an exemplary embodiment of the invention;

FIG. 6D is a schematic diagram showing a fourth stage of the second operational feature of the of FIG. 6A in accordance with an exemplary embodiment of the invention;

FIG. 6E is a schematic diagram showing a fifth stage of the second operational feature of FIG. 6A in accordance with an exemplary embodiment of the invention; and FIG. 6F is a schematic diagram showing a sixth stage of the second operational feature of FIG. 6A in accordance with an exemplary embodiment of the invention.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features.

Figure 1A:
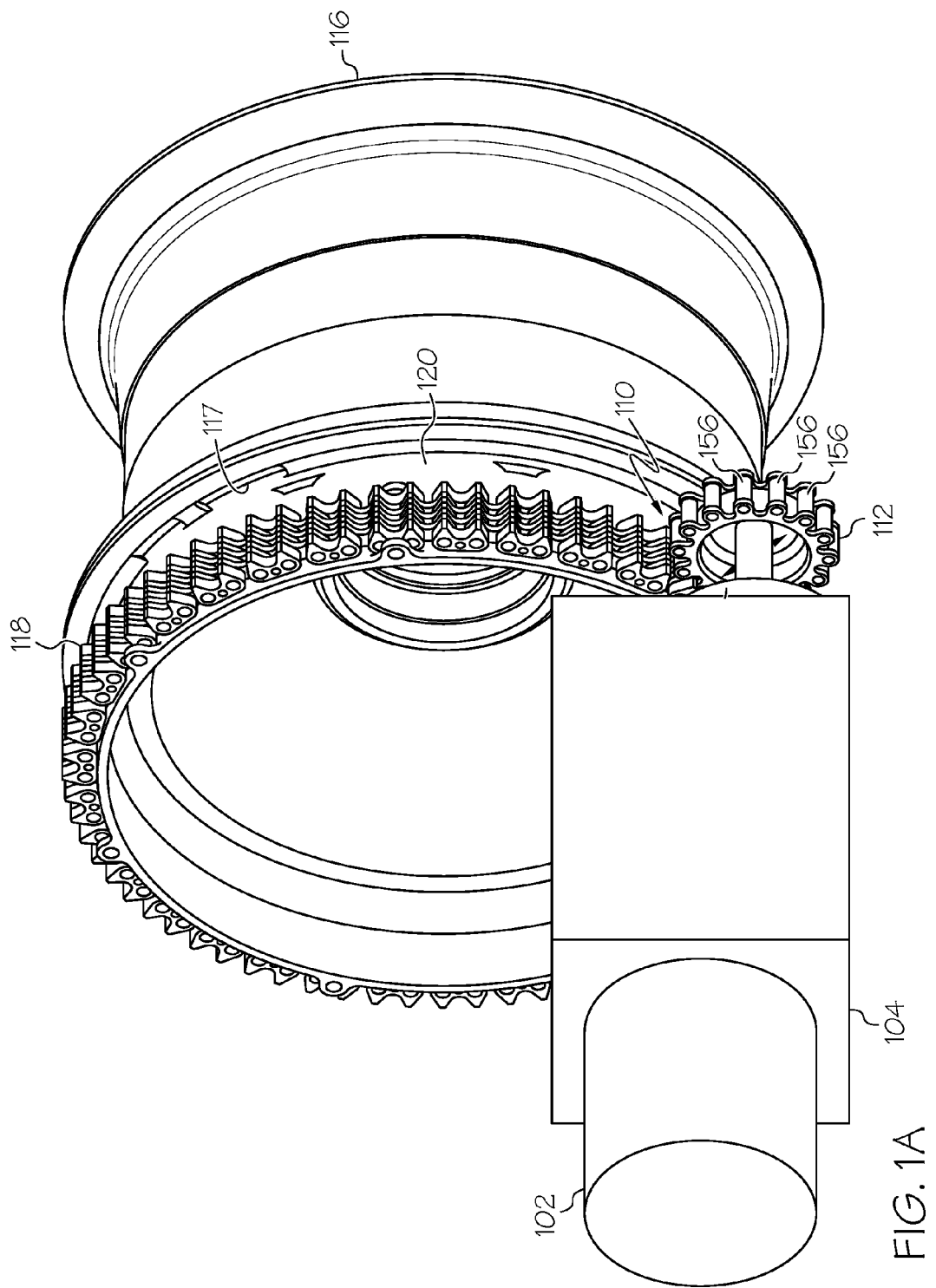
FIG. 1A is a perspective view of an electric taxi system (ETS) in accordance with an exemplary embodiment of the invention.
Figure 1B:
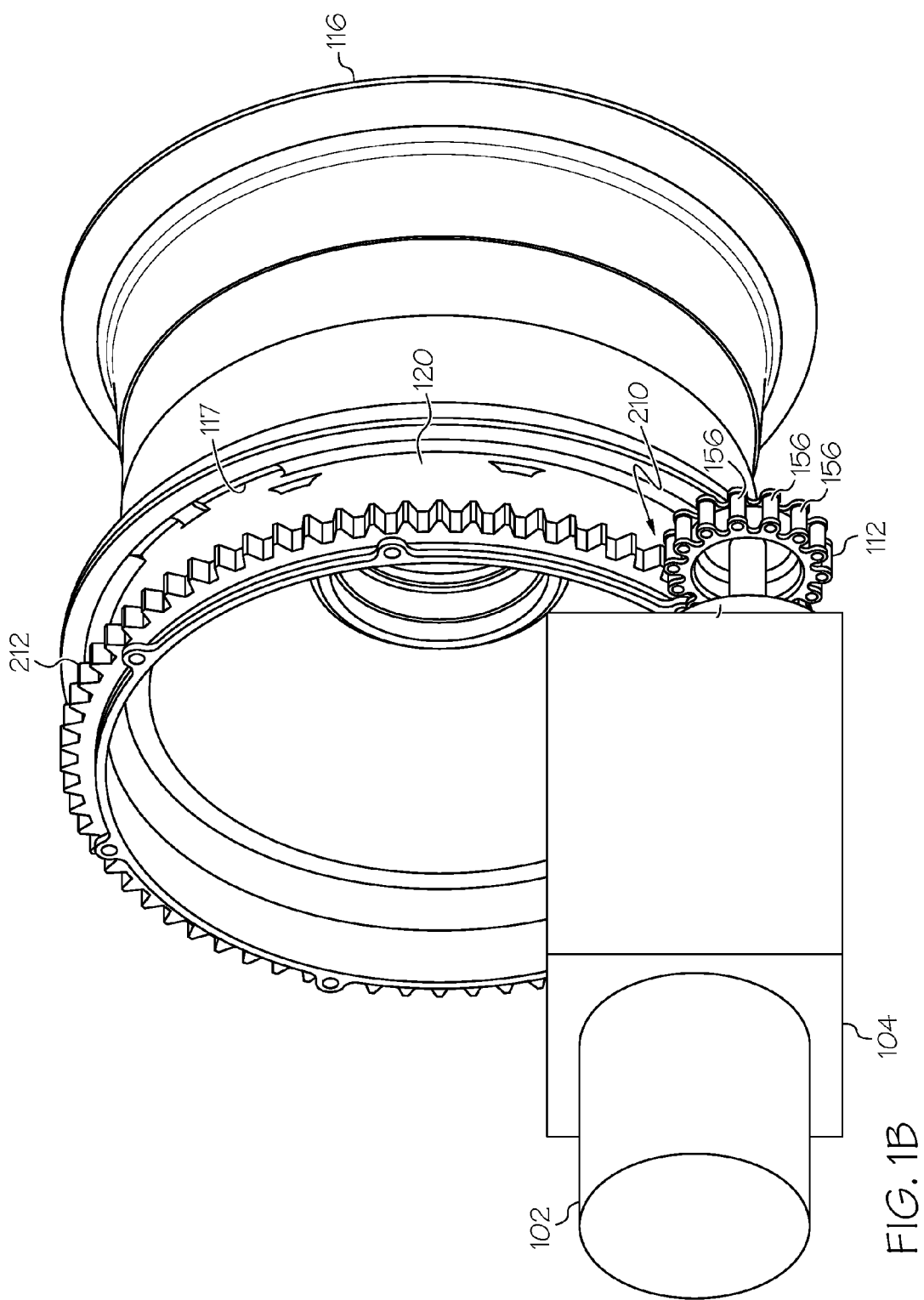
FIG. 1B is a perspective view of an electric taxi system (ETS) in accordance with a second exemplary embodiment of the invention.

Broadly, embodiments of the present invention generally provide a roller-based drive system that can deliver power with a non-cyclical angular velocity even when a center distance between a driving element and a driven element may vary. Aspects of the subject technology may be useful in aircraft landing gear systems during taxiing of the aircraft Referring now to FIG. 1A, an exemplary embodiment of a roller-based drive system 110 incorporates a gearbox 104 having compliance apparatus (described hereinbelow). In FIG. 1 the drive system 110 is shown schematically as part of an aircraft electric taxi system (ETS) 100. The ETS 100 may include a source of motive power such as an electric motor 102. The gearbox 104 may be coupled to the motor 102. The drive system 110 may include a driving element or driver 112 selectively engageable with a driven element such as a chain 118 coupled to a wheel 116 of an aircraft (not shown). In an exemplary embodiment, the driver 112 may be a roller sprocket with rollers 156 employed as driving elements. In an exemplary embodiment, the chain 118 may be a plate chain coupled circumferentially around a wheel extension ring 120.

Referring now to FIG. 1A, a second embodiment of a roller-based drive system 210 may differ from the drive system 110 of FIG. 1A in that the drive system 210 may employ a sprocket 212 attached directly to the wheel 116 as a driven element.

Figure 2A:
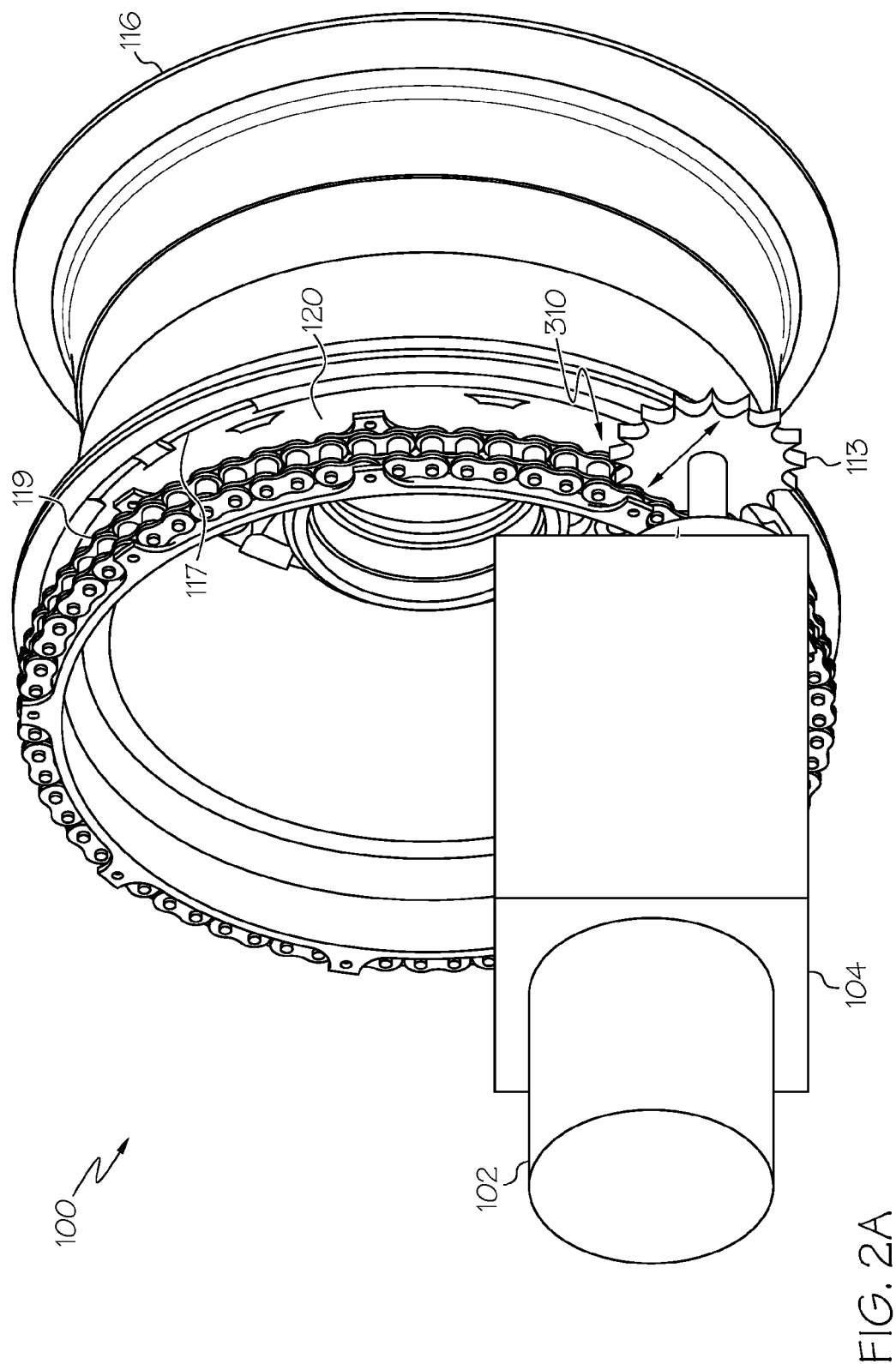
FIG. 2A is a perspective view of an electric taxi system (ETS) in accordance with a third exemplary embodiment of the invention.

Referring now to FIG. 2A, a third exemplary embodiment of a drive system 310 may differ from the drive system 110 of FIG. 1 in that the drive system 111 may include a roller chain 119 driven by a driver 113 which may be a conventional sprocket.

Referring now to FIG. 2B, a fourth embodiment of a roller-based drive system 410 may differ from the drive system 310 of FIG. 2A in that the drive system 410 may employ rollers 456 attached directly to the wheel 116

Figure 3:
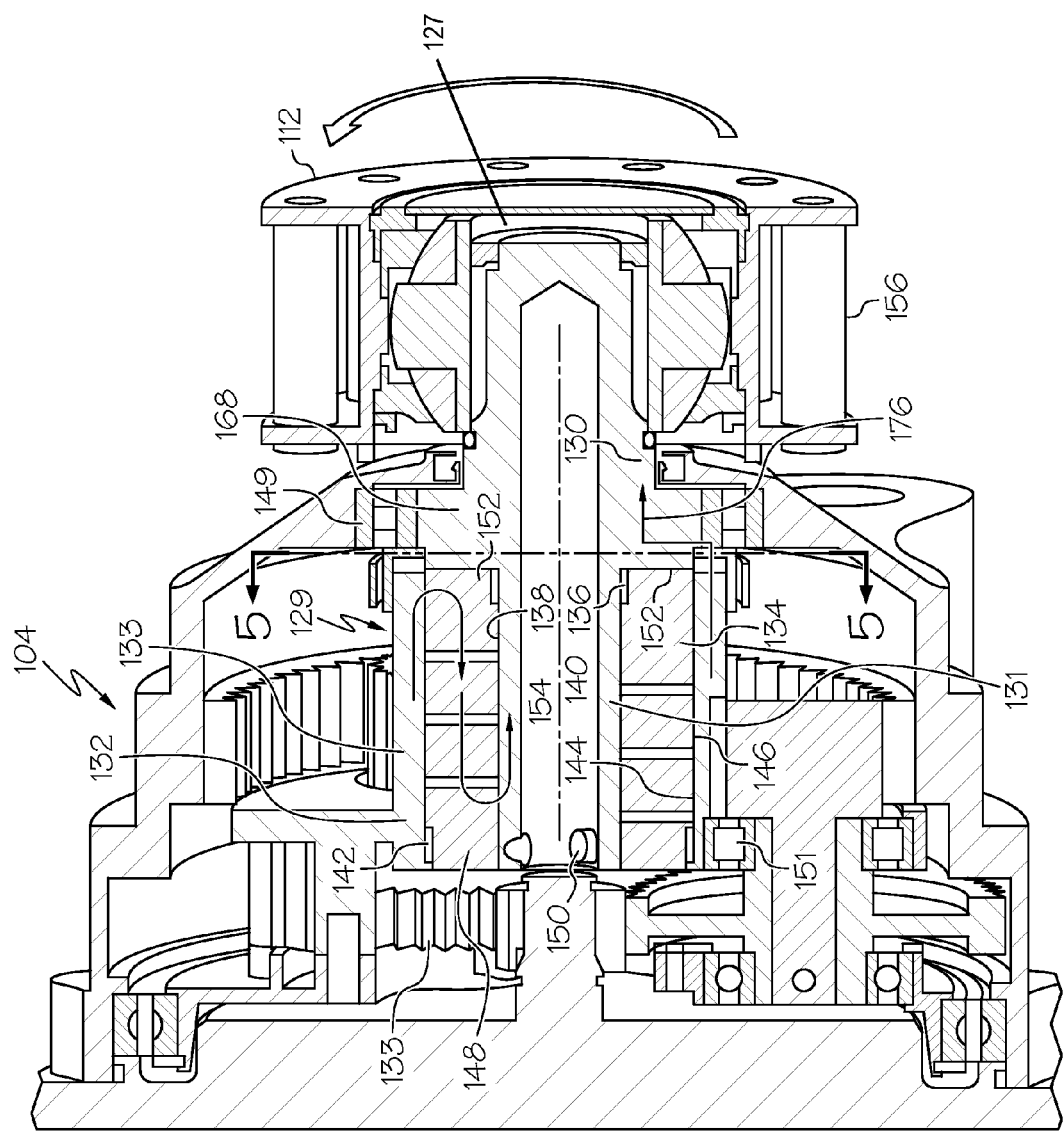
FIG. 3 is a cross-sectional view of a gearbox in accordance with an exemplary embodiment of the invention.

Referring now to FIG. 3, there is shown a cross-sectional view of the gearbox 104. The driver 112 may be coupled, at a power output end 127 of the gearbox 104, to an output shaft assembly 129. The output shaft assembly 129 may include; a first shaft segment 130 (hereinafter shaft segment 130) coupled to a sprocket 112 of drive system 110; a second shaft segment 132 (hereinafter shaft segment 132) coupled to a gear train 133 of the gearbox 104; and a flexible connecting member such as a torsion spring 134. The shaft segment 130 and the shaft segment 132 may be coupled to the torsion spring 134, with the torsion spring 134 interposed between the shaft segment 130 and the shaft segment, 132 to form a first torque-transmitting path 154 through the torsion spring. 134

An output-end bushing 136 may be interposed between an outer surface 138 of the shaft segment 130 and an inner cylindrical surface 140 of the torsion spring 134. An input-end bushing 142 may be interposed between an inner surface 144 of the shaft segment 132 and an outer cylindrical surface 146 of the torsion spring 134. Positioning of the output-end bushing 136 may accommodate relative rotational motion between the torsion spring 134 and the shaft segment 130. Positioning of the input-end bushing 142 may accommodate relative rotational motion between the torsion spring 134 and the shaft segment 132.

A portion 133 of the shaft segment 132 may be concentric with and may overlap a portion 131 of the shaft segment 130. The torsion spring 134 may be interposed between the overlapped portion 133 of the shaft segment 132 and the overlapped portion 131 of the shaft segment 130. Such a concentric and overlapping arrangement may provide the beneficial effect of providing a desirable stiffness (i.e., resistance to bending) within two separated shafts. It may be noted that only one bearing 149 may support the shaft segment 130 and only one bearing 151 may support the shaft segment 132. In other words, the inherent stiffness of the separated but overlapped shaft segment 132 and shaft segment 130 accommodates a desirably compact design of the gearbox 104 with only a minimal number of supporting bearings.

An input end 148 of the torsion spring 134 may be pinned to the shaft segment 130 with pins 150. An output end 152 of the torsion spring 134 may be keyed to the shaft segment 132 with keys 153, as shown in FIGS. 3A and 3B. The torsion spring 134 may provide a spring-biased, torque-transmitting path 154 between the shaft segment 132 and the shaft segment 130 (see serpentine arrow 154 in FIG. 3).

When the gearbox 104 is employed to drive a high-inertia load such as the aircraft wheel 116, non-conjugate meshing may produce cyclical acceleration pulses of the shaft segment 130. In that regard, the shaft segment 130 may experience momentary variations in angular velocity such that the angular velocity of the shaft segment 130 may not be equal to the angular velocity of the shaft segment 132. Adverse effects of such momentary inequalities of angular velocities may be advantageously mitigated by torsional flexing of the torsion spring 134.

Referring now to FIGS. 4A, 4B and 4C, a relationship of the torsion spring 134 and a roller 156 of the driver 112 is displayed schematically during a progressive meshing of the roller 156 and the plate chain 118 of FIG. 1. In FIG. 4A, the roller 156 is shown at an exemplary initial or first stage of non-conjugate meshing. (The reference to "first" is not intended to mean a starting point or position of the invention; rather, "first" is merely used for purposes of explanation.) In this first stage, the chain 118 may be momentarily driven with a increased driving force that is higher than a nominal driving force (i.e., a driving force that may result during conjugate meshing of the driver 122 and the chain 118). In the context of the aircraft ETS 100 of FIG. 1, the momentary increase in driving force may not actually move the chain 118 faster than its nominal speed because it is attached to the wheel 116 which has a high moment of inertia. In such a context, first stage of non-conjugate meshing may actually produce momentary reduction of angular velocity of the roller 156 instead of momentary acceleration of the chain 118. This slowing of the roller 156 may result in a partial rotation of the shaft segment 130 at an angular velocity less than the angular velocity of the shaft segment 132.

The torsion spring 134 may momentarily expand to make up the difference in angular velocity of the shaft segment 130 and the shaft segment 132. FIG. 4A illustrates this condition. A reference point 157 on an annular surface 158 of the torsion spring may move from a first position 160 to a second position 162. The first position 160 may be representative of the torsional spring 134 as it is compressed to transmit a nominal torque load for a particular taxiing speed of the aircraft. The second position 162 may be representative of the torsional spring 134 as it is relaxed or expanded from the nominal torque load position 160.

FIG. 4B illustrates an exemplary next or second stage of meshing. In this second stage, the chain 118 may be momentarily driven with a conjugate driving force that may equal the nominal driving force. In such a context, the angular velocity of the shaft segment 130 may be equal to the angular velocity of the shaft segment 132. Since there is no difference in angular velocity that needs to be reconciled, the torsion spring 134 may momentarily compress to its nominal torque load position 160.

In FIG. 4C, the roller 156 is shown at an exemplary further or third stage of non-conjugate meshing. In this third stage, the chain 118 may be momentarily driven with a [unclear] driving force lower than the nominal driving force. In the context of the aircraft ETS 100 of FIG. 1, the momentary decrease in driving force may not actually move the chain 118 slower than its nominal speed. Instead, this third stage of non-conjugate meshing may actually produce a momentary increase of angular velocity of the roller 156 instead of momentary slowing of the chain 118. This acceleration of the roller 156 may result in a partial rotation of the shaft segment 130 at an angular velocity greater than the angular velocity of the shaft segment 132.

The torsion spring 134 may momentarily compress to make up the difference in angular velocity of the shaft segment 130 and the shaft segment 132. FIG. 4C illustrates this condition. A reference point 157 on the annular surface 158 of the torsion spring may move from the nominal torque load position 160 to a third position 164. The third position 164 may be representative of the torsional spring 134 as it compressed from the nominal torque load position 160.

Referring back now to FIG. 3, it may be seen that because torsion spring 134 is an element of the torque transmitting path 154, it may be robust enough so that it may transfer torque loads from the shaft segment 132 to the shaft segment 130 whenever the torque transmitting path 154 is operational. However, considerations of spring size may be made when the gearbox 104 is employed in the ETS 100. The ETS 100 may place widely varying torque loads on the gearbox 104. For example, when an aircraft is moving across tarmac at speeds of 2 knots to about 20 knots, the shaft segment 130 may be subject to nominal taxiing torque loads. When an aircraft is initially moved by the ETS 100, so-called "breakaway" torque loads may develop in the shaft segment 130. These breakaway torque loads may be 2 to about 4 times greater than the nominal taxiing torque loads. In an ETS design, it is important to achieve compactness and light weight. In view of that design goal, the torsion spring 134 may be advantageously sized so that it has a spring constant high enough to transmit nominal taxing torque loads but not so high as needed to transmit breakaway torque loads. Breakaway torque develops only when an aircraft is moving slowly. During slow aircraft movement there is little or no risk of damage of the gearbox 104 if non-conjugate meshing is allowed to occur without performing transmission error correction. In that regard, the gearbox 104 may operate, during such low-speed breakaway aircraft movement, without employment of the torsion spring 134 in a torque-transmission path.

Figure 5:
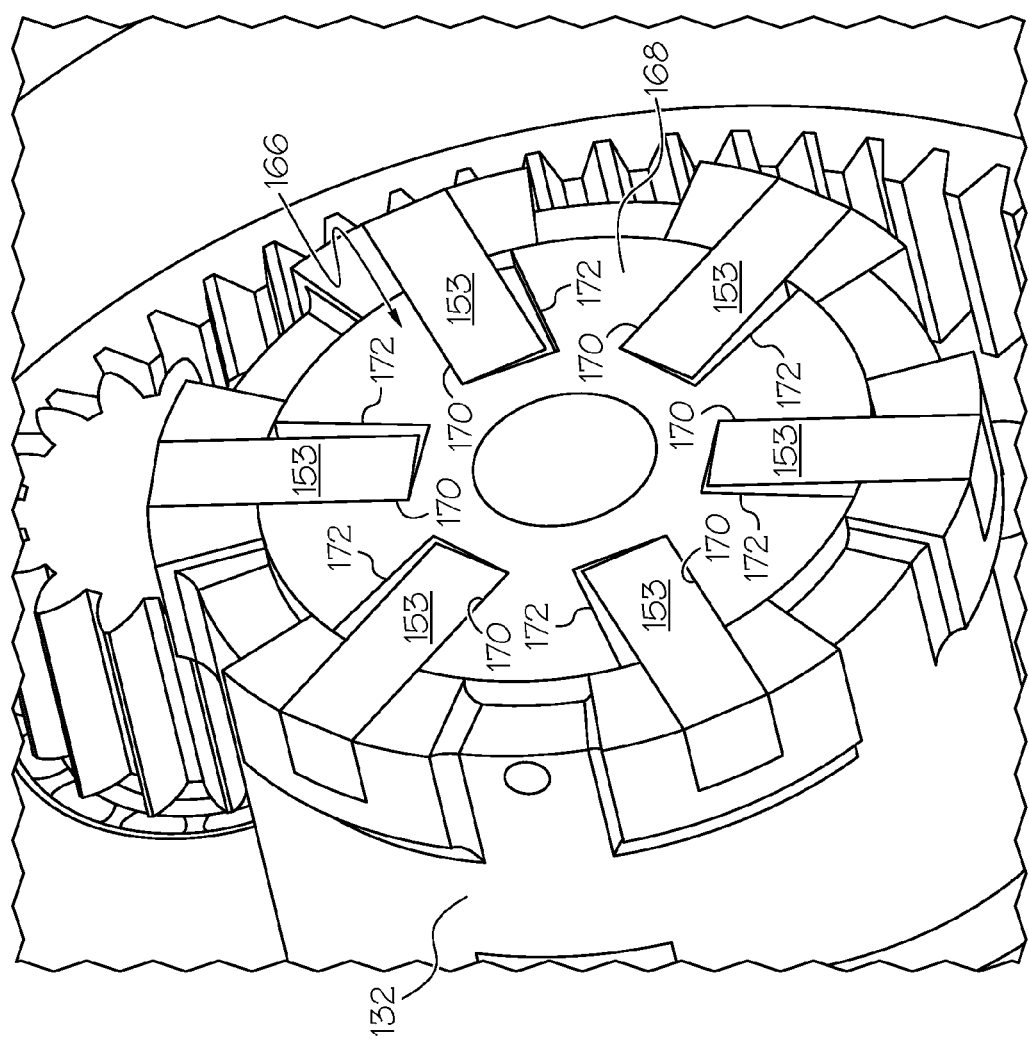
FIG. 5 is a perspective cross-sectional view of the gearbox of FIG. 3 taken along the line 5-5 of FIG. 3 in accordance with an exemplary embodiment of the invention.

Referring now to FIG. 5, there is shown a spring-load limiting system 166 that may be employed to extend torque transmitting capability of the gearbox 104 beyond the torque transmitting capability of the torsion spring 134. The shaft segment 130 may be provided with a slotted flange 168. Portions of the keys 153 may extend into slots 170 of the flange 168. As explained hereinbelow, compression of the torsion spring 134 may result in movement of the keys 153 within the slots 170. When the torsion spring 134 is compressed responsively to high torque loads such as breakaway torque loads, the keys 153 may be rotationally displaced to engage with sides 172 of the slots 170. In an exemplary embodiment, the keys 153 may engage the sides 172 upon such rotational displacement no greater than about 4 degrees to about 6 degrees.

Referring now to FIGS. 6A, 6B, 6C, 6D, 6E and 6F, these are schematic diagrams that illustrate interrelationships among the torsions springs 134, the keys 153 and the slots 170 during various phases of operation of the gearbox 104.

FIG. 6A illustrates a condition in which there is no torque load applied to the gearbox 104. A reference point 174 is in a position that is representative of the torsion spring being in a relaxed state. The key 153 may be positioned in a center of the slot 170.

FIG. 6B illustrates a condition in which there is nominal torque load for a particular taxiing speed applied to the gearbox 104. The reference point 174 is in a position shown with an angle A. In other words, the torsion spring 134 may be rotationally compressed by an amount corresponding to the angle A. The key 153 may be displaced from the center of the slot 170 by an amount that corresponds to the angle A.

FIG. 6C illustrates a condition in which there is nominal torque load for a particular taxiing speed applied to the gearbox 104 and in which angular velocity of the shaft segment 130 is less than angular velocity of the shaft segment 132. The reference point 174 is in a position shown with an angle A-C. In other words, the torsion spring 134 may be rotationally compressed by an amount corresponding to the angle A-C. The key 153 may be displaced from the center of the slot 170 by an amount that corresponds to the angle A-C.

FIG. 6D illustrates a condition in which there is nominal torque load for a particular taxiing speed applied to the gearbox 104 and in which angular velocity of the shaft segment 130 equals angular velocity of the shaft segment 132. The reference point 174 is in a position shown with an angle A. In other words, the torsion spring 134 may be rotationally compressed by an amount corresponding to the angle A. The key 153 may be displaced from the center of the slot 170 by an amount that corresponds to the angle A.

FIG. 6E illustrates a condition in which there is nominal torque load for a particular taxiing speed applied to the gearbox 104 and in which angular velocity of the shaft segment 130 exceeds angular velocity of the shaft segment 132. The reference point 174 is in a position shown with an angle A+C. In other words, the torsion spring 134 may be rotationally compressed by an amount corresponding to the angle A+C. The key 153 may be displaced from the center of the slot 170 by an amount that corresponds to the angle A+C.

FIG. 6F illustrates a condition in which there is high torque load applied to the gearbox 104, such as a breakaway torque load. The reference point 174 is in a position shown with an angle B. In other words, the torsion spring 134 may be rotationally compressed by an amount corresponding to the angle B. The key 153 may be displaced from the center of the slot 170 by an amount that corresponds to the angle B and the key may be engaged with the side 172 of the slot 170. In this circumstance, the shaft segment 132 may be directly coupled to the shaft segment 130. Consequently, a second torque-transmission path 176 (see FIG. 3) may develop. The torque transmission path 154 may be no longer operational. In other words, torque loading may bypass the torsion spring 134 so that the torsion spring 134 is not over-stressed during high torque loading of the gearbox 104.

It should be understood, of course, that the foregoing relates to exemplary embodiments of the invention and that modifications may be made without departing from the spirit and scope of the invention as set forth in the following claims.

We claim:

1. An electric taxi system (ETS) for an aircraft comprising:
   a roller-based drive system;
   a gearbox having an output shaft assembly, the output shaft assembly including:
      a first shaft segment coupled to a driving element of the roller-based drive system,
      a second shaft segment coupled to a gear train of the gearbox, and
      a torsion spring; and
   a spring-load limiting system including:
      a flange of the first shaft segment,
      at least one slot in the flange, and
      at least one key coupled to the second shaft segment and to the torsion spring,
   wherein the at least one slot is larger than the at least one key,
   wherein the at least one key is engageable with a side of the at least one slot upon occurrence of a predetermined rotational deflection of the torsion spring,
   wherein the torsion spring is interposed between and coupled to the first shaft segment and the second shaft segment, to form a first torque-transmitting path through the output shaft assembly, and
   wherein the gearbox has a second torque-transmitting path in which the first shaft segment is connected to the second shaft segment through the spring-load limiting system.

2. The ETS of claim 1 wherein the roller-based drive system includes a chain attached circumferentially around a wheel of the aircraft.

3. The ETS of claim 2 wherein the chain is a roller chain.

4. The ETS of claim 1 wherein the roller-based drive system includes rollers attached directly to a wheel of the aircraft.

5. A drive system comprising:
   a sprocket having a plurality of driving elements; and
   a source of motive power drivably connected to the sprocket with a segmented output shaft assembly,
   wherein the output shaft assembly includes a first shaft segment rotatably coupled with a second shaft segment through a flexible connecting member,
   wherein, during non-conjugate meshing of one of the driving elements, the flexible member accommodates rotational displacement of the first shaft segment rotates relative to the second shaft segment,
   wherein a portion of the second shaft segment is concentric with and overlaps a portion of the first shaft segment,
   wherein a torsion spring is interposed between overlapped portions of the first shaft segment and the second shaft segment,
   wherein a first bushing is interposed between a cylindrical surface of the first end of the torsion spring and the overlapped portion of the second shaft segment, and
   wherein a second bushing is interposed between a cylindrical surface of the second end of the torsion spring and the overlapped portion of the first shaft segment.

6. The drive system of claim 5
   wherein the first shaft segment is coupled to a first end of a torsion spring; and
   wherein the second shaft segment is coupled to a second end of the torsion spring opposite the first end.

7. An electric taxi system (ETS) for an aircraft comprising:
   a roller-based drive system;
   a gearbox having an output shaft assembly, the output shaft assembly including:
      a first shaft segment coupled to a driving element of the roller-based drive system,
      a second shaft segment coupled to a gear train of the gearbox, and
      a torsion spring; and
   a spring-load limiting system,
   wherein the torsion spring is interposed between and coupled to the first shaft segment and the second shaft segment, to form a first torque-transmitting path through the output shaft assembly,
   wherein the gearbox has a second torque-transmitting path in which the first shaft segment is connected to the second shaft segment through the spring-load limiting system,
   wherein the spring constant of the torsion spring is low enough so that the second torque-transmitting path is operational during initial ground movement of the aircraft, and
   wherein the spring constant of the torsion spring is high enough so that only the first torque-transmitting path is operational during taxiing of the aircraft at speeds higher than about 2 knots.

\* \* \* \* \*